United States Patent [19]

Morishita et al.

[11] Patent Number: 4,482,399

[45] Date of Patent: Nov. 13, 1984

[54] NITRIDED CAST IRON PRODUCT AND METHOD FOR MANUFACTURING THE SAME

[75] Inventors: Tuyoshi Morishita; Toshihiko Hattori; Yashuhumi Kawado; Kouji Tarumoto, all of Hiroshima, Japan

[73] Assignee: Toyo Kogyo Co., Ltd., Hiroshima, Japan

[21] Appl. No.: 525,932

[22] Filed: Aug. 24, 1983

[30] Foreign Application Priority Data

| | | | |
|---|---|---|---|
| Aug. 26, 1982 | [JP] | Japan | 57-148174 |
| Sep. 16, 1982 | [JP] | Japan | 57-161276 |

[51] Int. Cl.[3] .......................... B32B 15/08; C21D 1/10

[52] U.S. Cl. .................................. 148/31.5; 148/16.6; 428/417; 428/422; 428/457; 428/469

[58] Field of Search ............................ 148/31.5, 16.6; 428/469, 417, 422, 457

[56] References Cited

U.S. PATENT DOCUMENTS

| | | | |
|---|---|---|---|
| 3,960,610 | 6/1976 | Steinbrecher et al. | 148/31.5 |
| 4,042,425 | 8/1977 | Ohashi et al. | 148/31.5 |
| 4,206,004 | 6/1980 | Ohashi et al. | 148/31.50 |
| 4,225,294 | 9/1980 | Kakuwa et al. | 418/142 |

FOREIGN PATENT DOCUMENTS

| | | | |
|---|---|---|---|
| 4645071 | 2/1973 | Japan | 148/31.5 |
| 51-35568 | 10/1976 | Japan . | |
| 648258 | 1/1951 | United Kingdom | 148/16.6 |
| 274813 | 12/1977 | U.S.S.R. | 148/16.6 |

*Primary Examiner*—Veronica O'Keefe

*Attorney, Agent, or Firm*—Fleit, Jacobson, Cohn & Price

[57] ABSTRACT

A nitrided cast iron product comprising cast iron matrix material and graphite particles distributed in the matrix material, a nitrided layer formed in a surface of the cast iron product and having gaps between the graphite particles and the matrix material, the gaps being exposed to the surface of the product and filled with resin which has a resistance to dissolution under a temperature below 250° C.

7 Claims, 10 Drawing Figures

(X 400)

NITRIDED CAST IRON PRODUCT AND METHOD FOR MANUFACTURING THE SAME

The present invention relates to a nitrided cast iron products and a method for manufacturing the same. More particularly, the present invention pertains to nitrided cast iron products having an increased corrosion-resistant property and an improved method for manufacturing such cast iron products.

It has been well known to subject cast iron products to nitriding treatment to improve wear-resistance property of the products. For example, it is effective and has been widely adopted in cast-iron cylinders for automobile engines to form a hard layer on the inner wall surface thereof by subjecting it to a nitriding treatment to thereby improve the wear-resistant property. It should however be noted that, when a cast iron product is subjected to a nitriding treatment, the graphite particles in the vicinity of the product surface are thinned, producing fine gaps around the graphite particles. The formation of such fine gaps is further enhanced because the nitriding treatment apt to form protuberancies of the matrix material in the surface area at the boundaries of graphite particles and the protuberancies are apt to be broken when the product is subjected to a grinding treatment. Such gaps may function as lubricant oil pockets in case of a cylinder for gasoline engines so that favourable results can rather be expected, however, in case of diesel engines they may cause corrosions since diesel fuel contains relatively high concentration of sulphur. In general cast into products, it has been well known to fill surface defects with glass or similar material, however, such techniques cannot be applied to a manufacture of engine cylinders in which heat and wear-resistant properties are of great importance.

It is therefore an object of the present invention to product nitrided cast-iron products which have improved corrosion resistant property as well as a satisfactory heat-resistant property.

Another object of the present invention is to provide nitrided cast-iron products which have corrosion resistant property as well as wear and heat-resistant properties.

A further object of the present invention is to provide nitrided cast-rion products which are resistant to corrosion wear.

Still further object of the present invention is to provide a novel method for manufacturing such improved cast-iron products.

According to the present invention, the above and other objects can be accomplished by a nitrided cast iron product comprising cast-iron matrix material and graphite particles distributed in said matrix material, a nitrided layer formed in a surface of said cast iron product and having gaps between said graphite particles and said matrix material, said gaps being exposed to the surface of said product and filled with resin which has a resistance to dissolution under a temperature below 250° C. The cast iron product in accordance with the present invention has an improved wear resistant property because of the nitrided layer formed on the surface. Since the gaps which are inherently formed in the nitriding process are filled with resin having a sufficient heat resistant property, the matrix materials which may otherwise be exposed at the gap openings are covered by the resin. As the results, it becomes possible to apply the product of the present invention to a cylinder for diesel engines without having risk of corrosion.

In manufacturing the cast iron product of the present invention, a cast iron blank is subjected to a nitriding treatment to form a nitrided layer in a surface of the blank, then ground at the surface and thereafter applied at the surface with a coating of resin which is resistant to dissolution under a temperature below 250° C. to thereby fill gaps between graphite particles and matrix material at the surface of the blank. The blank may thereafter be heat treated to have the resin cured.

According to the present invention, preferable properties of the resin are that it is not deteriorated by engine fuel such as gasoline and light oil, sulfuric acid, lubricating oils and water, that it is not dissolved under a temperature below 250° C., and that it can readily be applied under a room temperature. Resin materials which can satisfactorily used in the present invention include epoxy resin, phenol resin, polyimide resin, polyamide resin, polyimideamide resin and fluoric resins. In a preferable mode of the present invention, the resin is coated on a surface of a nitrided cast iron blank after the surface is ground to remove protuberancies which are formed in the matrix material around graphite particles in the nitriding treatment, the blank surface is then rubbed under a pressure greater than 0.5 kg/cm$^2$ after the coating is dried to force the resin into the gaps between the graphite particles and the matrix material. Thereafter, the blank is subjected to a heat treatment for more than 0.5 hour under an atmospheric pressure and a suitable temperature between 100° and 400° C. which may be determined in accordance with the resin as used. Under a temperature below 100° C., the resin will not be cured to a satisfactory extent whereas under a temperature above 400° C., dissolution proceeds in the nitrided layer of the cast iron so that the wear resistant property will be decreased.

For nitriding treatment, any type of known technologies can be employed. For example, it is possible to employ anyone of the gas nitriding method, iron nitriding method, gas soft nitriding method and taftride method. Where the gas soft nitriding method is employed for manufacturing an engine cylinder line, it is preferred from the viewpoint of preventing distortions to carry out the nitriding process under a temperature of 550° to 600° C. for 30 minutes to 30 hours.

According to a preferable aspect of the present invention, the resin contains sacrificial particles comprised of metal which is inferior in electrolytic dissociation to iron which constitutes the matrix of the blank. The sacrificial particles function to protect the matrix material from electrolytic corrosion so that the corrosion resistant property can further be increased. Preferable metals for the sacrificial particles and Al and Zn and such particles may be contained in an amount between 5 and 80% in volume in the resin. With the sacrificial particle content less than 5 volume %, satisfactory results will not be obtained. Where the sacrificial particle content is greater than 80 volume %, similar problems will be encountered as in the case where the solid lubricant is added to the resin. The particle size should preferably be finer than 200 mesh or 74 microns.

The present invention will now be described by way of examples taking reference to the accompanying drawings, in which.

Figure 5:
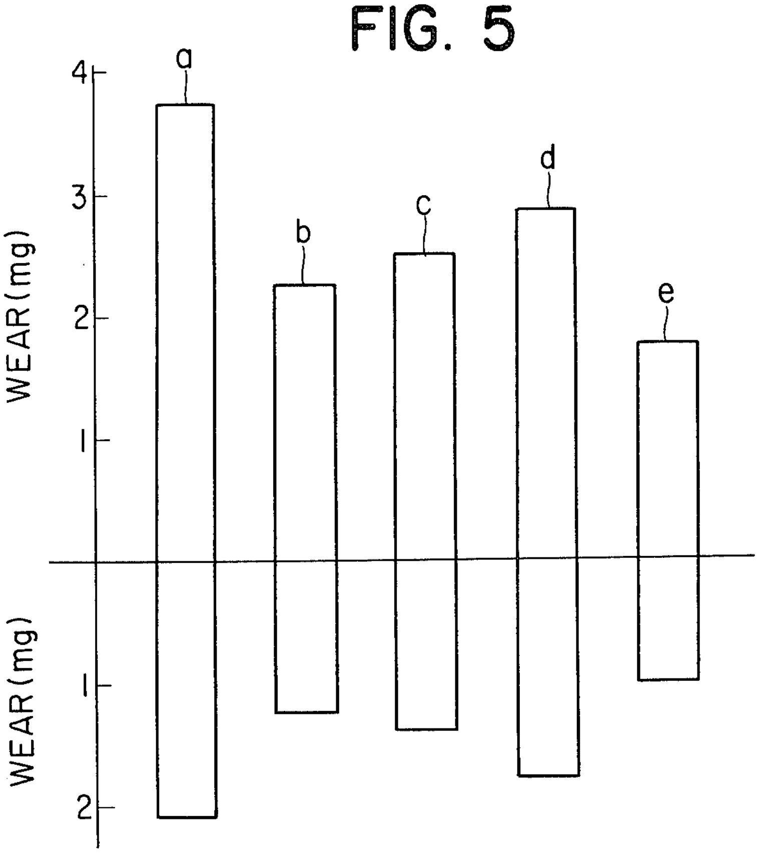
FIG. 5 is a diagram showing the results of wear tests in Example 1 of the present invention.
Figure 6:
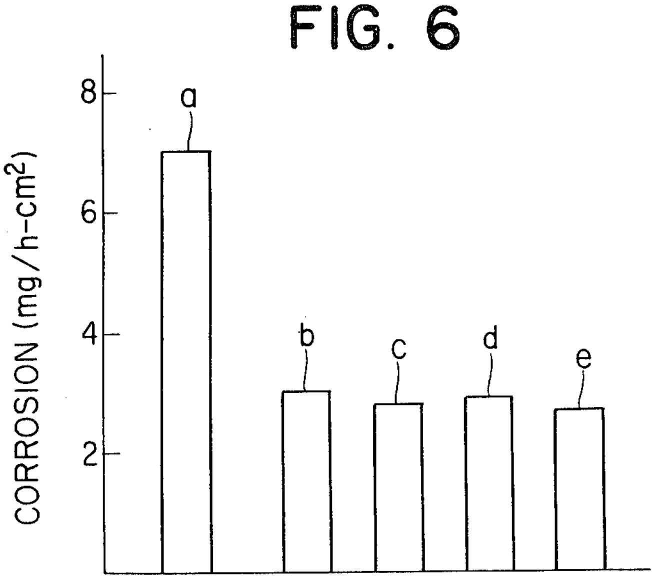
FIG. 6 is a diagram showing the results of the corrosion tests in Example 1.
Figure 8:
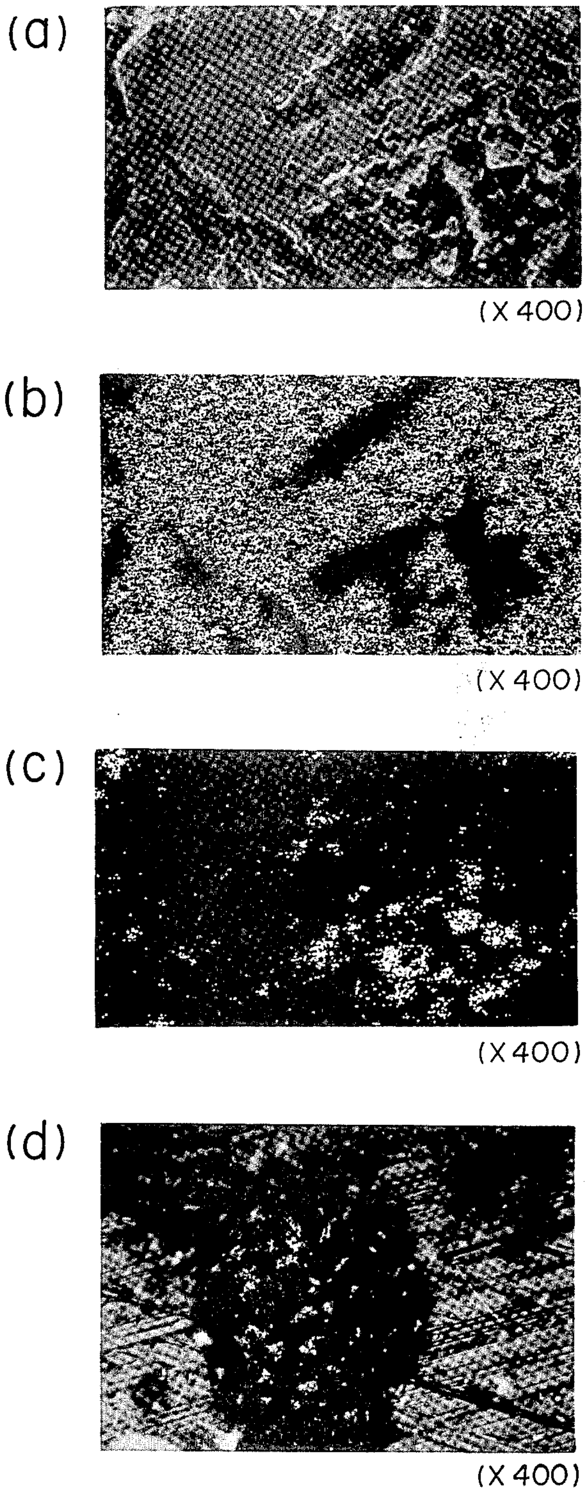
Figure 9:
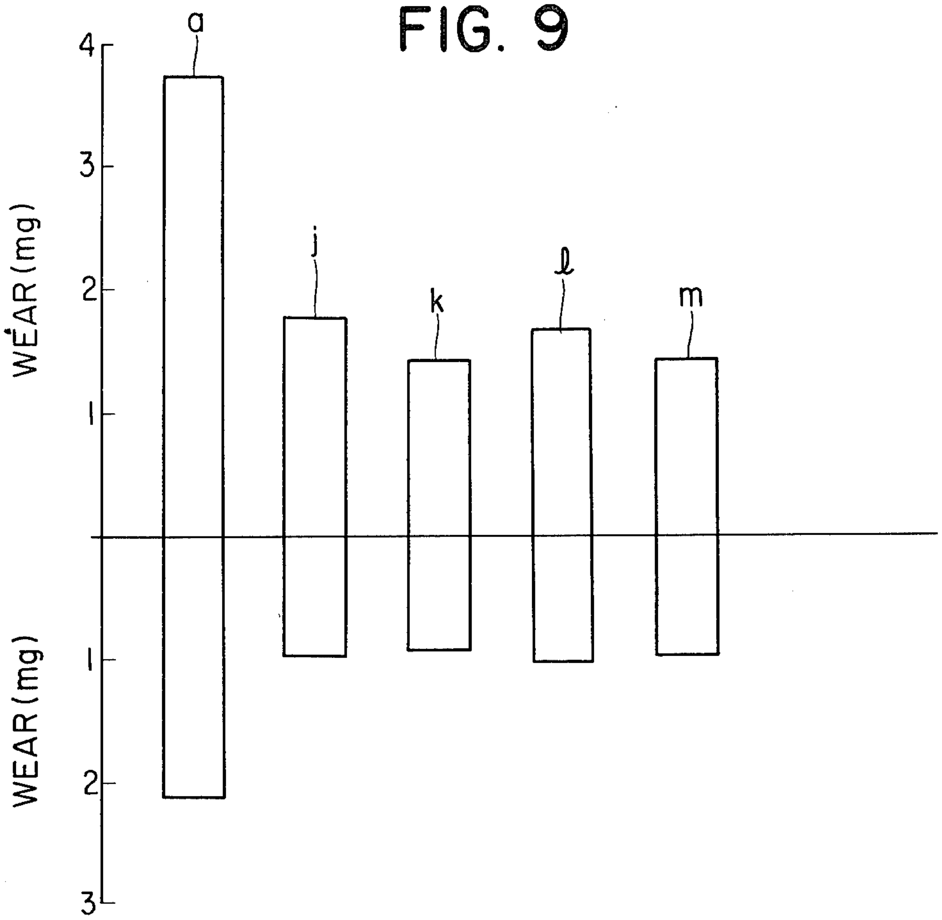
Figure 10:
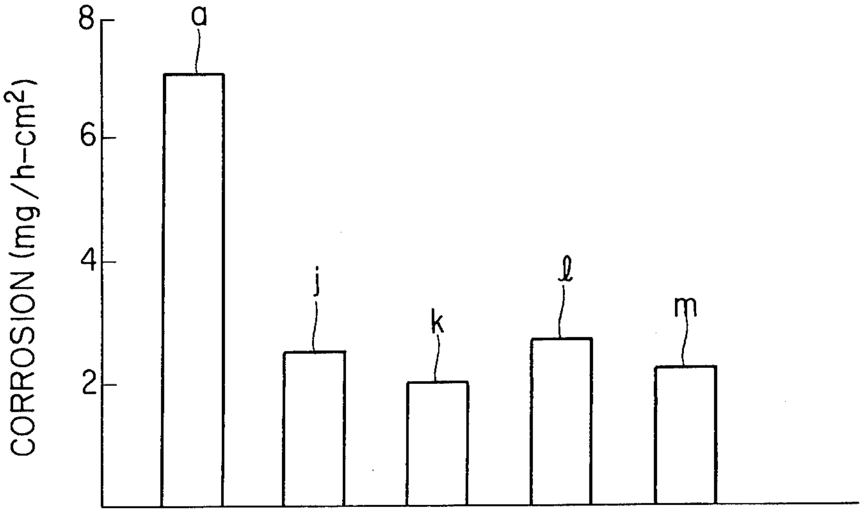

FIGS. 8(*a*), (*b*), (*c*) and (*d*) are microscopic photographs showing the surface areas of the cast iron specimens in Example 2 of the present invention; and FIGS. 9 and 10 are diagrams corresponding to FIGS. 5 and 6 but showing the test results in Example 2.

EXAMPLE 1

Figure 1:
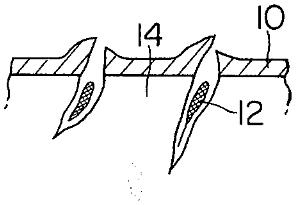
FIG. 1 is a sectional view of the surface portion of a cast iron after a nitriding treatment.

A cylindrical flaky graphite cast iron blank is casted from a material containing 3.5% C, 1.8% of Si, 0.7% of Mn, 0.2% of Cr, 0.7% of Cu, 0.065% of Sn and the balance of Fe, the percentage being in weight throughout the specification unless specifically mentioned. The blank is then machined and ground to a configuration having an inner diameter of 89 mm, an outer diameter of 98 mm and a length of 160 mm. The blank is then subjected to a soft nitriding treatment under a temperature of 570° C. and an atmosphere of 50% Rx and 50% $NH_3$ for 3 hours. As the result of the soft nitriding treatment, the blank is hardened at the surface area by being formed with a nitrided layer 10 which contains compounds of iron and nitrogen as shown in FIG. 1. The blank contains graphite particles which are in this example of flaky configuration. At the surface of the blank, there are formed protuberancies around the graphite particles 12. Further, the graphite particles in the surface area are thinned as the results of the nitriding treatment so that gaps are produced between the graphite particles 12 and the matrix material 14.

Figure 2:
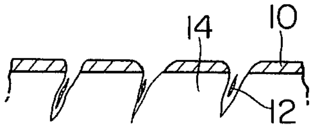
FIG. 2 is a sectional view similar to FIG. 1 but showing the surface portion after grinding.
Figure 3:
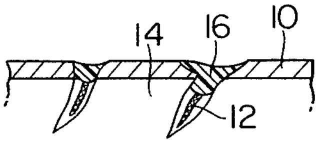
FIG. 3 is a sectional view of the surface portion after application of resin in accordance with the present invention.
Figure 7:
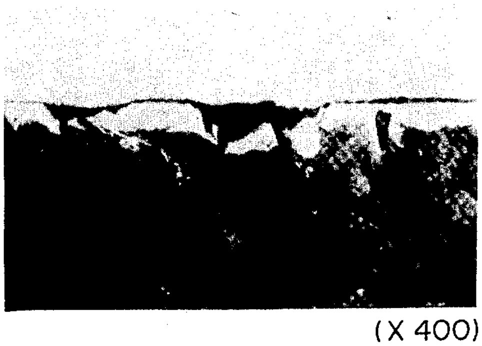
FIG. 7 is a microscopic photograph showing the section of nitrided layer in Example 1.

The blank surface is then ground for example by a honing operation to remove the protuberancies and provide a smooth surface as shown in FIG. 2. Then, the surface of the blank is coated with resin such as epoxy resin, phenol resin, polyimide resin and fluoric resin and, after the resin coating is dried under a room temperature, the blank surface is rubbed with a rubber wheel under a pressure of 1 kg/cm$^2$ to thereby force the resin into the gaps. Thereafter, the blank is heated for one hour under a temperature suitable for the resin as used. Thus, the gaps formed between the graphite particles 12 and the matrix material 14 are filled with resin as shown by 16 in FIG. 3. In FIG. 7, there is shown a microscopic picture of the resultant product with 400 times of magnification. FIG. 7, the gray area shows the nitrided layer and needle shaped black areas represent flaky graphite particles. The dark area at the surface of the blank shows the resin coating. Preferable heat treatment temperatures for several resins are shown in Table I.

TABLE I

| RESIN | HEAT TREATMENT TEMPERATURE |
|---|---|
| EPOXY RESIN | 180° C. |
| PHENOL RESIN | 180° C. |
| POLYIMIDE RESIN | 250° C. |
| FLUORIC RESIN | 350° C. |

The specimens as obtained in accordance with the Example 1 have been subjected to various tests.

(1) Principal Dry Wear Test

Figure 4:
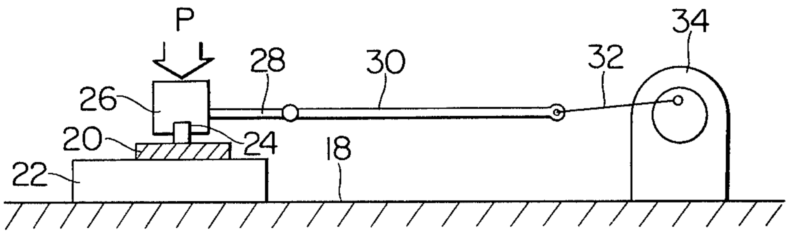
FIG. 4 is a side view of an apparatus which is used for wear tests.

FIG. 4 shows diagrammatically the apparatus used for the test. A specimen 20 of for example 15 mm wide and 75 mm long is provided from the cylindrical blank formed in accordance with the method of the Example 1. The specimen 20 is secured by for example bolts with the resin coated surface upside on a base 22 of the apparatus which is located on the floor 18. A sliding member 24 which may be provided from an engine piston ring is placed in sliding contact with the specimen 24. The sliding member 24 is attached to a holder 26 which is in turn attached to one end of an arm 28. The arm 28 is connected through connecting members 30 and 32 with a motor 34 in such a manner that the rotation of the motor 34 is converted into a reciprocating movement of the holder 26. Thus, the sliding member 24 is reciprocated on the specimen 20 as the motor 34 rotates. The holder 26 is applied with a load P to produce a contact pressure between the sliding member 24 and the specimen 20.

The test has been carried out with the following conditions.

Atmosphere: Room Condition
Sliding Speed: 700 cycle/min.
Number of Cycles: $2\times10^4$
Load P: 1.2 to 2.0 kg
Contact Pressure: 0.4 kg/mm$^2$
Contact Width: 10 mm
Contact Condition: Corrosive lubricant is used between the specimen and the sliding member for promoting wear
Method of Measuring Wear: Weight Measuring Method.

The results of the tests are shown in FIG. 5 in which the specimen a is the one having a nitrided layer but no resin coating. and, b, c, d and e the ones having a coating of epoxy resin, phenol resin, polyimide resin and fluoric resin, respectively. In the upper part, there are shown the amounts of wear of the respective specimens, whereas in the lower part there are shown the amounts of wear of the sliding members. It will be understood that the specimens b, c, d and e made in accordance with the present invention show decreased wear as compared with the specimen a of conventional structure. Further, the wear of the sliding member 24 is also decreased when it is used with a specimen in accordance with the present invention.

(2) Corrosion Test

Since it is supposed that the corrosions of the inner walls of diesel engine cylinders are mainly caused by $H_2SO_4$, corrosion tests have been conducted by dipping the specimens in sulfuric acid and thereafter measuring the weights. The tests have been carried out with the following conditions.

Test Solution: Water Solution of 1 vol.% of $H_2SO_4$
Temperature: Room Temperature
Dipping Time: 8 hours
Number of Specimens: 3 for Each Type The results of the tests are shown in FIG. 6 in terms of a decrease in weight in one hour for 1 $cm^2$ of the specimen area. It will be understood that the specimens b, c, d and e made in accordance with the present invention show decreased corrosion as compared with the specimen a representing prior art.

EXAMPLE 2

A cylindrical cast iron blank is formed and nitrided as in Example 1. After honing treatment, the blank surface is coated with epoxy resin containing sacrificial metal particles and rubbed with a rubber wheel in the same manner as in Example 1. Thereafter, the blank is heated to a temperature of 170° C. for one hour. FIGS. 8(*a*), (*b*), (*c*), and (*d*) show microscopic pictures of the surface areas of the blank treated in accordance with the present invention by using epoxy resin containing 30 vol.% of Al. In FIG. 8(*a*), the resin is shown by black areas and in FIG. 11(*b*), the matrix material is shown by white areas. FIG. 8(*c*) is also an X-ray photograph where the Al particles are shown by white areas. It will be understood in FIGS. 8(*a*), (*b*) and (*c*) that the Al particles are distributed in the resin filling the gaps. In FIG. 8(*d*), the epoxy resin is shown by black and the Al particles are shown by white dots in the resin.

Specimens are provided as in Example 1 from the cylindrical blanks and identified as in Table II.

TABLE II

| SPECIMEN | COATING |
|---|---|
| a | no coating |
| j | Epoxy resin containing 5% in volume of Al particles |
| k | Epoxy resin containing 80% in volume of Al particles |
| l | Epoxy resin containing 5% in volume of Zn particles |
| m | Epoxy resin containing 80% in volume of Zn particles |

(1) Principal Dry Wear Test

The specimens are subjected to wear tests in a manner as described in Example 1. The results are shown in FIG. 9. As in FIG. 5, the wear of each specimen is shown in the upper part whereas the wear of the cooperating sliding member in the lower part. It is apparent that the specimens in accordance with the present invention show improved wear resistant property. Further, the wear of the cooperating sliding member is also decreased to a significant extent.

(2) Corrosion Test

The specimens are subjected to the same corrosion test as in Example 1. The results are shown in FIG. 10. It will be noted that the corrosion is also significantly decreased in accordance with the present invention.

The invention has thus been shown and described with reference to specific examples, however, it should be noted that the invention is in no way limited to the details of the described examples but changes and modifications may be made without departing from the scope of the appended claims.

We claim:

1. A nitrided cast iron product consisting essentially of cast iron matrix material and graphite particles distributed in said matrix material, a nitrided layer formed on a surface of said cast iron product and having gaps between said graphite particles and said matrix material, said gaps being exposed to the surface of said product and filled with resin which has a resistance to dissolution under a temperature below 250° C.

2. A nitrided cast iron product in accordance with claim 1 in which said resin is selected from the group consisting of epoxy resin, phenol resin, polyimide resin, polyamide resin, polyimideamide resin and fluoric resins.

3. A nitrided cast iron product in accordance with claim 1 in which said resin contains sacrificial metal particles which are inferior in electrolytic dissociation to the matrix material.

4. A nitrided cast iron product in accordance with claim 3 in which said sacrificial metal particles are selected from Al and Zn.

5. A nitrided cast iron product in accordance with claim 3 in which said sacrificial metal particles are mixed with said resin to form a mixture, the metal particles being contained 5 to 80 vol.% in said mixture.

6. A method of manufacturing a nitrided cast iron product comprising steps of casting a blank including matrix material and graphite particles, subjecting the blank to a nitriding treatment to form at a surface thereof a nitrided layer which has exposed gaps between the graphite particles and the matrix material, grinding the surface, applying the surface with a coating of resin which is resistant to dissolution under a temperature below 250° C. to thereby fill the gaps between the graphite particles and the matrix material, and subjecting the blank to a heat treatment at a temperature between 100° and 400° C. to cure the resin.

7. A method in accordance with claim 6 in which said coating of resin is rubbed prior to heat treatment to force the resin into the gaps.

* * * * *